Patented Mar. 4, 1952

2,588,041

UNITED STATES PATENT OFFICE 2,588,041

SEPARATION OF METAL VALUES IN FLUORIDE COMPOSITIONS

Melvin A. Perkins and Monroe Couper, Wilmington, Del., assignors to the United States of America as represented by the United States Atomic Energy Commission No Drawing. Application April 5, 1946, Serial No. 659,855

3 Claims. (Cl. 23—88)

This invention relates to the separation of heavy metals in alkaline fluoride compositions.

In the manufacture of fluorine by electrolysis of anhydrous acid potassium fluoride electrolytes employing nickel anodes in steel electrolytic chambers, corrosion of nickel anodes and steel walls takes place and leads to the formation of a sludge containing these materials in combination with fluorine and acid potassium fluoride electrolyte. During the useful life of such cells as much as 25% of the electrolyte may ultimately be combined in a sludge containing these constituents. Part of this sludge is loose in the electrolyte and can be removed by sedimentation and decantation. The remainder is in the form of solid masses cemented to the cell wall surfaces. The massive deposits and the sediment may contain foreign matter consisting of solid particles of nickel from the anode, and iron oxide. The hardened sludge may be removed from the cell, after draining off the electrolyte, by the action of hot aqueous potassium fluoride solution injected through jets or sprays. This treatment causes solution of the acid potassium fluoride content of the sludge and forms $KHF_2$ by partial neutralization of the free acid. There remains as a solid residue from such treatment nickel and iron fluorides and occasionally small proportions of copper fluorides, which may be filtered off from the aqueous acid potassium fluoride solution. These solids, upon filtration, form a sludge cake containing potassium, nickel, and iron as well as fluorine.

It is an object of the present invention to separate the heavy metals from the potassium fluoride present in such mixtures and to separately recover the nickel and iron content of the mixture. Further objects will appear from the following description of the invention and illustrative example of its application.

In accordance with the present invention a solid fluoride mixture of the type described containing iron, nickel, and potassium in combined form is reacted with sufficient aqueous ammonium hydroxide to dissolve the nickel and precipitate the iron as a hydroxide.

The precipitated ferric hydroxide may be separated from the aqueous solution and the latter may be concentrated to precipitate the nickel as a nickel compound of fluorine and potassium. By such concentration the blue color indicating the presence of nickel may be completely eliminated leaving a clear colorless solution containing residual potassium and ammonium fluorides.

The process is especially applicable to sludge recovered from cell electrolyte by decantation and to sludge cake formed by treatment of massive electrolytic cell deposits with potassium fluoride to disintegrate the massive deposits and neutralize free hydrogen fluoride in excess of that corresponding to the formula $KHF_2$.

Since a part of the iron present in such mixtures is usually in the ferrous condition, it is desirable to oxidize this iron with a small amount of oxidizing agent before effecting the precipitation of iron as ferric hydroxide. Conversion of the iron to the ferric condition may be accomplished readily by blowing air into the mixture for a few hours or by the addition of other conventional oxidizing agents. The oxidation treatment is most efficiently carried out by applying it to the ammonia solution before separating precipitated ferric hydroxide.

After separation of ferric hydroxide from the solution the separated precipitate may be washed with additional ammonia solution to determine whether all of the nickel has been dissolved. By washing until the wash solution passing through the precipitate is colorless, complete removal of nickel from the precipitated iron is assured. Solution of the nickel can be accelerated by grinding the residue to improve mechanical contact with the solvent. The ammonia concentration of the solution employed for dissolving the nickel may be varied widely. Solutions as dilute as 3% $NH_3$ and as concentrated as 15% $NH_3$ have been employed satisfactorily. Upon evaporation of the nickel ammonia solution, a solid nickel salt containing potassium and fluorine precipitates until all of the nickel has been expelled from solution as indicated by the loss of color of the remaining solution. In order to reduce the bulk of precipitate present during evaporation, it is sometimes convenient to separate part of the precipitated nickel salt and then continue the evaporation to separate additional quantities of the salt. This is not essential however. The proportion of nickel in the separated nickel salt varies and salts containing from about 34% to about 46% nickel have been obtained.

The colorless solution from which the nickel salt is separated contains residual potassium fluoride and ammonium fluoride resulting from reaction of the ammonia with potassium acid fluoride. By evaporating off the water and heating the residue to a temperature of about 300° C. the ammonium fluoride may be sublimed and the potassium fluoride recovered as ammonia-free potassium fluoride residue.

The following example illustrates the application of the invention to the separation of an electrolyte sludge into its components. Unless otherwise stated proportions are expressed in terms of weight.

*Example*

An electrolyte sludge obtained from a steel cell employing nickel anodes and anhydrous KF.2HF electrolyte contains potassium, nickel, and iron fluorides and hydrofluoric acid corresponding to the composition 59% KF.2HF, 31% $NiF_2$, 10% $FeF_3$. One hundred parts by weight of this sludge is mixed with 100 parts by weight of water and sufficient potassium carbonate (about 29 parts by weight) to provide a final pH of 3, thus partially neutralizing the KF.2HF to $KHF_2$. The resulting mixture of solids and liquid is filtered and the filter cake is washed with 50 parts by weight of water. This treatment results in solution of a major proportion of the potassium as potassium acid fluoride, which can be recovered from the aqueous solution by evaporation.

The filter cake is slurried to 80 parts by weight of water; 120 parts of 23% ammonia solution and 5 parts of a diatomaceous earth type filtering agent are added. The mixture is agitated with air for about three hours at 20-30° C. It is then filtered and the filter cake is washed with about 150 parts by weight of 3% ammonia solution until the wash solution comes through colorless. The filter cake comprises the filtering agent and all of the iron as ferric hydroxide. The filtrate and wash liquors are combined and evaporated to 15-20% of their original volume, yielding a large volume of a pale green fluoride of nickel and potassium which is separated from the solution by filtration. The filtrate is further evaporated until it becomes colorless, yielding a large volume of a yellow fluoride of nickel and potassium, which is separated by filtration.

The colorless liquid concentrate is evaporated to dryness leaving a residue of potassium and ammonium fluorides. This residue, by heating to 300° C., is separated into ammonium fluoride, which sublimes and may be recovered by cooling, and potassium fluoride, which remains as a solid residue of the sublimation.

It will be understood that we intend to include variations and modifications of the invention and that the preceding example is illustrative only and in no wise to be construed as a limitation upon the invention, the scope of which is defined in the appended claims, wherein

We claim:

1. A method of recovering the valuable components of a solid sludge which contains potassium, nickel, iron and fluorine values and which is produced in the electrolysis of acid potassium fluoride when using nickel anodes in steel electrolytic chambers which comprises treating said solid sludge with sufficient ammonium hydroxide to dissolve the nickel and potassium values thereof and to precipitate the iron values thereof in the form of a hydroxide, separating the precipitated iron hydroxide from the ammonium hydroxide solution of nickel and potassium salts, concentrating said ammonium hydroxide solution to cause precipitation of the nickel values as a nickel salt containing fluorine and potassium, separating said precipitated nickel salt from said concentrated ammonium hydroxide solution, evaporating said concentrated solution to dryness to obtain a dried residue containing ammonium fluoride and potassium fluoride, heating said dried residue at about 300° C. to cause the ammonium fluoride to sublime, recovering the ammonium fluoride which sublimes by cooling, and recovering the ammonia-free potassium fluoride left after sublimation.

2. A method as set forth in claim 1 wherein the ammonium hydroxide solution, before separation of precipitated iron, is treated with an oxidizing agent to convert any ferrous iron therein to the ferric state.

3. A method as set forth in claim 2 wherein air is employed as the oxidizing agent.

MELVIN A. PERKINS.
MONROE COUPER.

REFERENCES CITED

The following references are of record in the file of this patent:

UNITED STATES PATENTS

| Number | Name | Date |
|---|---|---|
| 1,815,054 | Driggs | July 21, 1931 |
| 2,356,183 | Shepard et al. | Aug. 22, 1944 |
| 2,422,907 | Johnson | June 24, 1947 |

OTHER REFERENCES

Treadwell and Hall "Analytical Chemistry," vol. I, 7th ed., pages 152 and 200 (1930).